April 18, 1967 D. T. McGREGOR 3,314,508
AUTOMATIC BRAKE ADJUSTMENT MEANS
Filed March 1, 1965
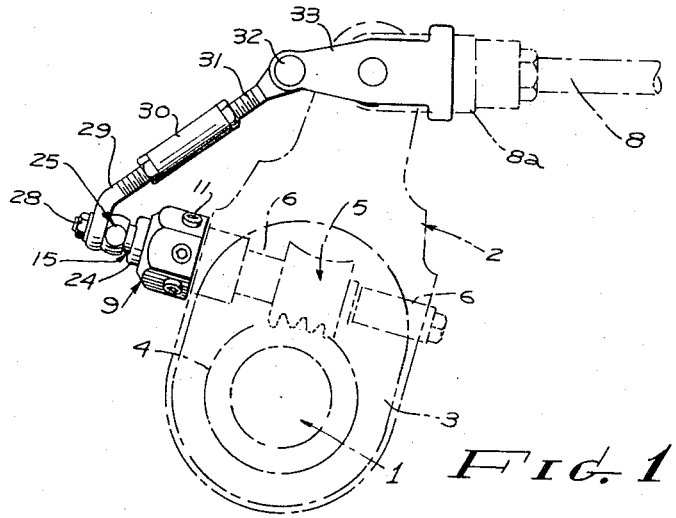
FIG. 1
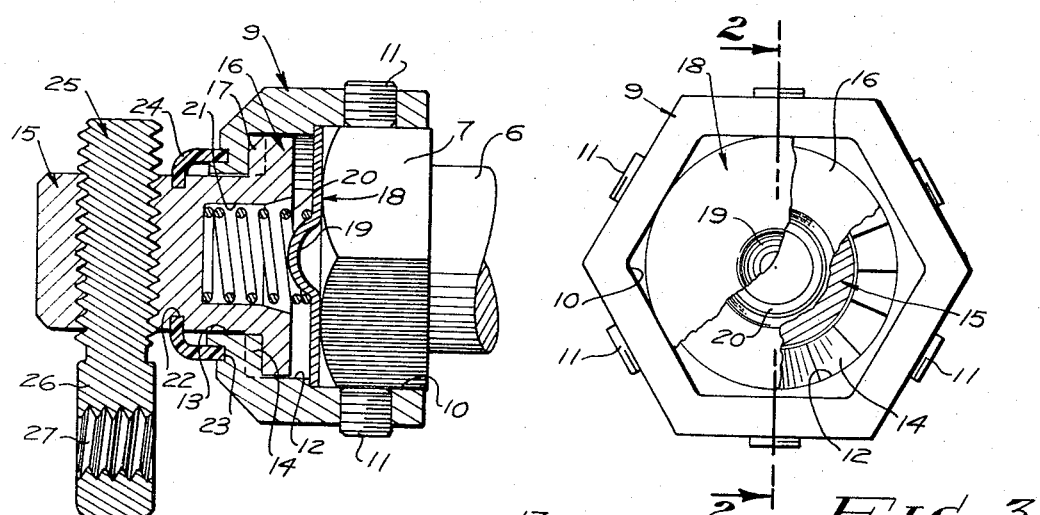
FIG. 2
FIG. 3
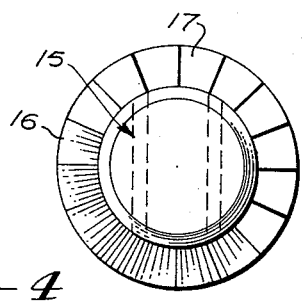
FIG. 4
INVENTOR.
DONALD T. McGREGOR
BY
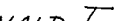
ATTORNEYS

United States Patent Office 3,314,508
Patented Apr. 18, 1967

3,314,508
AUTOMATIC BRAKE ADJUSTMENT MEANS
Donald T. McGregor, La Crescenta, Calif., assignor to Carlodge Corporation, Los Angeles, Calif., a corporation of California
Filed Mar. 1, 1965, Ser. No. 436,256
3 Claims. (Cl. 188—196)

This invention relates to brake adjustors for brakes, and included in the objects of this invention are:

First, to provide an automatic brake adjustment means which may be installed on a conventional brake and operating mechanism without disassembly of the mechanism.

Second, to provide an automatic brake adjustment means which includes a novel ratcheting assembly which may be readily secured to the exposed head of the adjustment shaft which forms a part of the brake operating mechanism, and also includes a linkage assembly which readily attaches to the linkage of the brake operating mechanism.

With the above and other objects in view, as may appear hereinafter, reference is directed to the accompanying drawings in which:

FIGURE 1 is a side view, indicated by broken lines a conventional brake operating mechanism and showing by solid lines the automatic brake adjustment means;

FIGURE 2 is an enlarged sectional view taken through 2—2 of FIGURE 1 showing the ratcheting assembly forming a part of the automatic brake adjustment means and indicating fragmentarily the adjacent end of the adjustment shaft to which the ratcheting assembly is attached;

FIGURE 3 is an end view of the ratcheting assembly removed from the adjustment shaft with portions broken away to illustrate the internal construction;

FIGURE 4 is an end view of the stub shaft which forms a part of the ratcheting assembly.

The conventional brake operating mechanism on which the automatic brake adjustment means is adapted to be mounted includes a shaft 1 which is adapted to be oscillated and which is connected with the conventional brake in such a manner as to effect spreading of the brake shoes against the brake drum. Mounted on the shaft is a level structure 2 which includes a casing or housing 3 containing a worm gear 4 and a worm 5. Extending through the worm 5 is an adjustment shaft 6 having a head 7 which protrudes from the housing 3. The extremity of the level structure 2 is connected to an operating rod 8 through a yoke 8a. The structure thus far described is conventional.

In the exercise of the present invention, a cap member 9 is provided having a hexagonal socket portion 10 adapted to fit over the hexagonal head 7 of the adjustment shaft 6. In the construction shown, each of the six sides of the hexagonal socket 10 is provided with a setscrew 11 which is forced against a corresponding side of the head 7. Beyond the hexagonal portion 10, the cap member forms a bore 12 of slightly smaller diameter. At its end opposite from the hexagonal socket portion 10, the cap member is provided with a bearing aperture 13 of smaller diameter than the bore 12. The shoulder provided between the bore 12 and the bearing aperture 13 is provided with a ring of ratchet teeth 14.

The bearing aperture 13 journals a stub shaft 15 having a flange 16, one side of which is provided with ratchet teeth 17 for cooperation with the ratchet teeth 14. Separating the hexagonal socket portion 10 from the bore 12 is a disk 18 which may be press fitted or otherwise secured in place. The center portion of the disk 18 is provided with a centering boss 19 to position one end of a spring 20 which extends into a socket 21 formed in the stub shaft 15. The spring serves to maintain the ratchet teeth in yieldable intermeshing engagement.

The extended portion of the stub shaft is provided with a channel 22 and the adjacent end of the cap member 9 is provided with an annular groove 23. A seal ring 24 is provided with an internal flange which fits into the channel 22 and an axially extending portion which fits in the groove 23.

Beyond the channel 22, the stub shaft is transversely screw-threaded to receive a screw shank 25. The screw shank is provided with a head 26 at one end having a screw-threaded crossbore 27.

The crossbore 27 receives a journal bolt 28 on which is pivotally mounted a link 29 which forms one end of a turnbuckle and is screw-threaded into a turnbuckle sleeve 30. A second link 31 is also screw-threaded in the turnbuckle sleeve and its extended end is joined by a pivotal connection 32 to an extension bracket 33 adapted to be secured in a suitable conventional manner to the operating rod 8 or the fitting 8a which joins this rod to the level structure 2.

Operation of the automatic brake adjustment means is as follows:

The cap member 9 is secured by its setscrews 11 to the head 7 of the conventional adjustment shaft 6. The extension bracket 33 is fastened to the operating rod 8. The turnbuckle including the sleeve 30 and links 29 and 31 are connected to the extension bracket 33 and to the journal bolt 28. After trial connection to the screw shank 25, a determination is made as to whether the shank should be extended or retracted in order to obtain the desired degree of rotation of the adjustment shaft 6.

Initially, the automatic brake adjustment means is set so that for the normal length of travel of the operating rod 8, the movement of the stub shaft 15 is less than the distance between the teeth of the ratchet. As the brake shoes wear, the length of stroke of the rod 8 increases gradually until the oscillating movement of the ratchet body 11 exceeds the ratchet teeth spacing so as to adjust the adjustment means an amount corresponding to one ratchet tooth and causing the operating rod 8 to return to its normal shorter stroke.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. The combination with a brake operating mechanism having a brake actuating shaft, an oscillatable lever and reciprocable rod for oscillating said shaft, wherein the lever includes a housing containing a worm gear for adjusting the brake actuating shaft to take up slack due to wear of the brakes, a worm for advancing the worm gear and an adjustment shaft for said worm including an exposed head, of an automatic slack adjuster comprising:

(a) a cap having a socket fitting over said shaft head, and including a coaxial journal aperture and a first ring of ratchet teeth bordering said journal aperture;

(b) means for securing said cap to said shaft head;

(c) a stub shaft journalled in said aperture and including a flanged end disposed within said cap member, and a second ring of ratchet teeth on said flange;

(d) a spring within said socket urging said sets of ratchet teeth into mutual engagement;

(e) and means interconnecting said stub shaft and said brake operating mechanism to effect oscillation of said stub shaft thereby to advance said cap member and worm adjustment shaft.

2. The combination with a brake operating mechanism having a brake actuating shaft, an oscillatable lever and reciprocable rod for oscillating said shaft, wherein the lever includes a housing containing a worm gear for adjusting the brake actuating shaft to take up slack due to wear of the brakes, a worm for advancing the worm gear and an adjustment shaft for said worm including an exposed head, of an automatic slack adjuster comprising:
(a) a cap having a socket fitting over said shaft head, and including a coaxial journal aperture and a first ring of ratchet teeth bordering said journal aperture;
(b) means for securing said cap to said shaft head;
(c) a stub shaft journalled in said aperture and including a flanged end disposed within said cap member, a second ring of ratchet teeth on said flange, and a screw-threaded transverse bore in its extended end;
(d) an axially adjustable lever having a screw shaft fitting said bore, and an eyelet at its extremity movable to and from said stub shaft to vary the effective length of said lever;
(e) and means joined to said eyelet and to said brake operating mechanism to effect oscillation of said stub shaft thereby to advance said cap member and worm adjustment shaft.

3. The combination with a brake operating mechanism having a brake actuating shaft, an oscillatable lever and reciprocable rod for oscillating said shaft, wherein the lever includes a housing containing a worm gear for adjusting the brake actuating shaft to take up slack due to wear of the brakes, a worm for advancing the worm gear and an adjustment shaft for said worm including an exposed head, of an automatic slack adjuster comprising:
(a) a ratchet mechanism including coaxial members having mutually engageable ratchet teeth and capable of limited relative coaxial movement, one of said members having a socket to fit the exposed head of said adjustment shaft;
(b) means for securing said socket member to said exposed head of said adjustment shaft;
(c) a radially adjustable lever arm secured to the other of said members;
(d) and means interconnecting said lever arm and brake operating mechanism to effect oscillation of said second member thereby to advance said first member of said ratchet mechanism and said worm adjustment shaft.

References Cited by the Examiner
UNITED STATES PATENTS

| | | | |
|---|---|---|---|
| 2,752,009 | 6/1956 | MacDougall | 74—522 |
| 3,177,983 | 4/1965 | McGregor | 158—79.5 |

FRED C. MATTERN, Jr., *Primary Examiner.*

W. S. RATLIFF, *Assistant Examiner.*